(12) United States Patent　　(10) Patent No.: US 8,090,339 B1
Lackey　　(45) Date of Patent: Jan. 3, 2012

(54) OFF-LINE CHANNEL TUNING AMPLITUDE SLOPE MATCHED FILTER ARCHITECTURE

(75) Inventor: Raymond J. Lackey, Bohemia, NY (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 13/227,563

(22) Filed: Sep. 8, 2011

Related U.S. Application Data

(62) Division of application No. 12/315,469, filed on Dec. 3, 2008, now Pat. No. 8,036,624.

(51) Int. Cl.
　　*H04B 1/10*　　(2006.01)
(52) U.S. Cl. .................... 455/296; 455/307; 455/340
(58) Field of Classification Search .................. 455/296, 455/303
　　See application file for complete search history.

(56) References Cited

U.S. PATENT DOCUMENTS

| | | | |
|---|---|---|---|
| 5,752,166 A | 5/1998 | Dorenbosch et al. | |
| 6,693,971 B1 | 2/2004 | Kowalski | |
| 7,881,690 B2 * | 2/2011 | Dubois et al. | 455/307 |
| 7,995,982 B2 * | 8/2011 | Kawabe et al. | 455/296 |
| 8,036,624 B2 * | 10/2011 | Lackey | 455/307 |

* cited by examiner

*Primary Examiner* — Hai L Nguyen
(74) *Attorney, Agent, or Firm* — Daniel J. Long; Dilworth & Barrese, LLP; Leo G. Lenna

(57) ABSTRACT

A tuning control system and associated method is provided for continuously and automatically tuning a lobed amplitude slope matching filter (ASMF) to a band center of an interfering signal to provide improved rejection of an interfering signal coupled from a transmission antenna into a local receive antenna in the presence of local multi-path, thereby providing improved interference cancellation system performance. The tuning control system is provided as an element of an interference cancellation system.

8 Claims, 13 Drawing Sheets

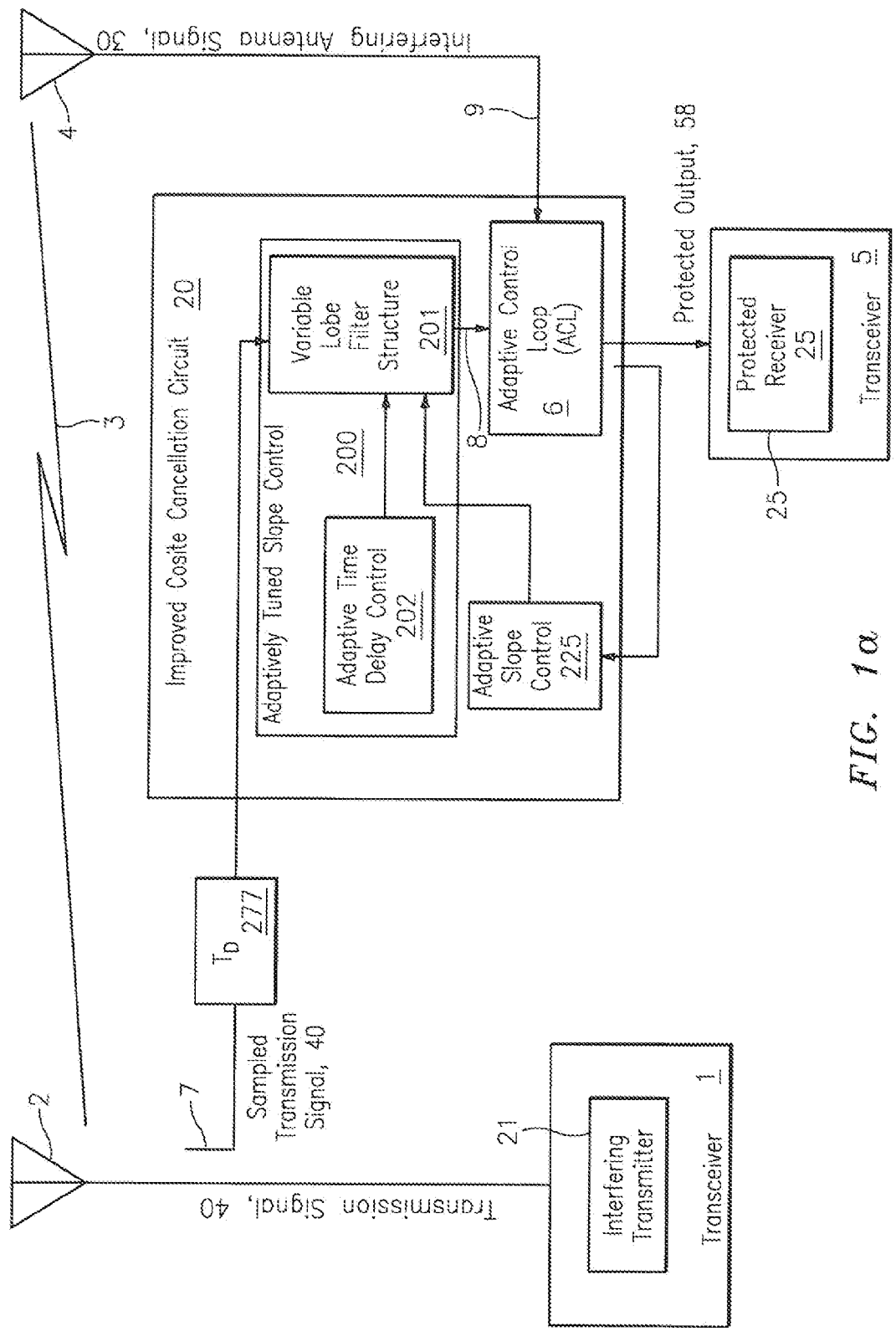
FIG. 1α

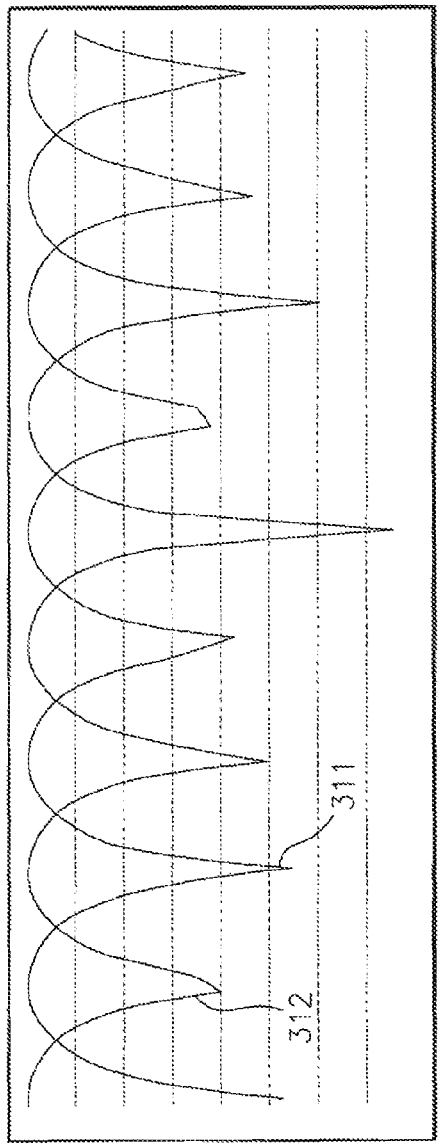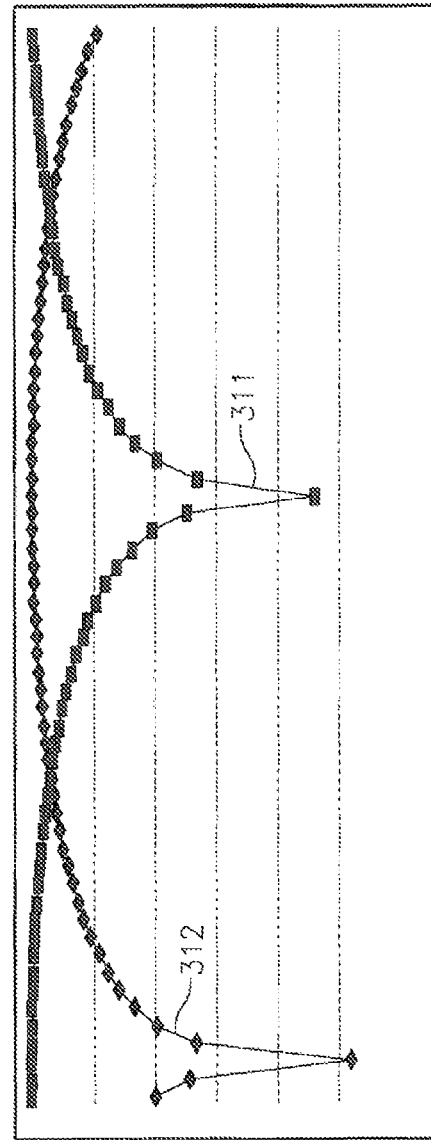
FIG. 3a
FIG. 3b

OFF-LINE CHANNEL TUNING AMPLITUDE SLOPE MATCHED FILTER ARCHITECTURE

CROSS-REFERENCE TO RELATED APPLICATIONS

This Application is a divisional of U.S. application Ser. No. 12/315,469 filed Dec. 3, 2008, the contents of which are incorporated herein by reference.

FIELD OF THE INVENTION

The invention relates to the field of radio communication and, in particular, to the reduction of interference in signals coupled from a transmission antenna into a local receive antenna in the presence of a local multipath.

Description Of The Related Art

Unwanted (i.e., interfering) signals manifest themselves in several ways. Interference can cause a reduction in the sensitivity of a receiver (receiver desensitization), masking of a desired signal, tracking of an undesired interfering signal and loss of the desired signal, and processing of the unwanted interfering signal instead of the desired signal. Each of these manifestations of interference limits the communication capabilities of the radio system afflicted by this problem. The effects of interference can be some combination of the absence of usable output from a receiver, false signals from a receiver, and malfunction of a device which is operated by the receiver. During emergency situations, the loss and corruption of the desired signal can be critical.

Unwanted signal interference is generally caused by modulation of signals provided to the receiver by the carrier waves, or by the wideband noise, generated by collocated transmitters. Unwanted signal interference also occurs when frequency-hopping transmitters are transmitting signals at frequencies that are substantially close to the frequency of the desired receiver signal (i.e., co-channel operation). Unwanted signal interference can also be caused by "pseudo white-noise" generated by transmitters over a wide band of frequencies on either side of the transmitter's operating frequency. It is often found in collocated transceiver systems that this "pseudo white-noise" reaches unacceptable levels within the operating band of adjacent receivers. Unwanted signal interference is also attributed to signals (i.e., spurious emissions) generated by transmitters at odd harmonics of the fundamental frequency of the transmitter output signal. This is caused by the non-linear transfer characteristics of amplifiers in the transmitter chain, or by passive inter-modulation at the transmitter or receiver antenna connectors.

In order to substantially reduce and eliminate the undesired interfering signals while maintaining the spatial benefits afforded by proximately locating transceivers, especially frequency-hopping transceivers, several signal processing techniques have been proposed. These techniques include agile filtering, agile filtering with multicoupling and interference cancellation.

When the signal noise and spurious sidebands generated by the interfering transmitter are strong, broadband, and scenario dependant, standard interference cancellation is inadequate. Changes in the scenario surrounding the platform may vary the coupling between the transmitter and the protected receiver and thus require adjustment of system parameters in an adaptive process.

Interference cancellation involves sampling the transmitter output signal in order to eliminate from the received signal, any interfering signal having a frequency proximate to the receiver carrier frequency. In co-site environments, a collocated source usually interferes with the receiver due to the finite isolation between transmit and receive antennas. This interference in a co-site environment is a combination of several factors, desensitization caused by one or more nearby high-power transmitter carriers and wideband moderate to low-power interference components associated with those carriers. These interference components are received by the collocated radio and degrade system operation. The nearby high-power transmitter carrier signals could simply exist as a part of the platform signal environment. Further, the interfering signals may be classified as either cosite or remote interferers. A cosite interferer is physically collocated with the receiver on a platform permitting a physical circuit connection from the interference generator to the receiver. A remote interferer is located far enough from the receiver to preclude a physical circuit connection.

A typical Interference cancellation system utilizes a correlation-based adaptive controller using feedback derived after the cancellation process. The system takes a sample of an interference signal and adjusts the magnitude and phase such that the result is equal in amplitude and 180° out of phase with the interference signal at the input of the receiver. The vector sum of the two signals will cancel, leaving only the signal of interest. In practice, however, the two signals are not identical, due to unwanted distortion in the reference path, as well as differences in signal path lengths and non-ideal components in the Tx/Rx signal paths. Cancellation performance is a function of amplitude and phase match between the interference signal and the sampled signal. Transmission path distortions include time delay, magnitude amplitude and phase distortion, linear amplitude and phase distortion, and quadratic distortion, correction of each adding a level of performance enhancement but also adding to system complexity and difficulty in implementing the corrections.

To suppress a wideband interference signal, the performance of a cancellation system is directly proportional to the match between the sampled transmission cancellation signal and the receive path interference signal across the signal bandwidth. The interference cancellation system (ICS) compensates for minor corrections and component drift by controlling a complex weight that implements flat phase and amplitude controls in an adaptive control loop (ACL) to correct the magnitude amplitude and phase errors between the two. The receive path interference signal provided to the ICS is disrupted by signal distortions in time of arrival, linear and non-linear (i.e., quadratic) amplitude, and linear and non-linear phase. The sampled transmission cancellation signal must be adjusted to match this distorted receive path signal as closely as possible to achieve complete nulling of the received interference signal. The present disclosure addresses these concerns by focusing on minimizing mismatch errors caused by linear amplitude distortions.

As is well known, cosite interference cancellation requires amplitude slope matching across the signal bandwidth to achieve a deep null across the band.

U.S. Pat. No. 6,693,971 "Wideband co-site interference reduction apparatus" (Kowalski) issued on Feb. 17, 2004 and assigned to BAE Systems Information and Electronic Systems Integration Inc. (Greenlawn, N.Y.), incorporated by reference herein in its entirety, discloses a method of implementing a near-linear correction of the amplitude slope using an amplitude slope matching filter. However, a drawback of the system and method of Kowalski is that it requires information from the transmitter to tune the amplitude slope matching filter and a switch to select the proper filter phasing to operate on a lobe rather than near a null. This may require modification to the transmitter to extract current transmission frequency and generation of the look-up table to translate this frequency code to a delay value and switch control.

Co-pending application, "Tuning Amplitude Slope Matched Filter Architecture", provides a system and method for continuously adjusting the tuning of a lobed filter so that a center frequency of a reference input signal is near the peak of the lobed filter to obtain a quiescent flat slope in the region of the tracked signal spectrum. By providing a continuous adjustment of the lobed filter the need to receive control information from the transmitter to tune an amplitude sloped matched filter is eliminated, thereby overcoming a limitation of the prior art. However, a drawback of this proposed approach is that it requires dithering the inline tuning value which causes a modulation to be applied to the inline signal, even after the system was converged to an appropriate stable solution. Dithering the inline tuning value is undesirable because it reduces the achievable nulling and it introduces the dithering noise to the receiver, thus reducing the demodulation achievable.

A need therefore exists for a system and method for continuously adjusting the tuning of a lobed filter so that a center frequency of a reference input signal is near the peak of the lobed filter to obtain a quiescent flat slope in the region of the tracked signal spectrum without applying a modulation to the inline signal and thus limiting the interference cancellation achievable by the ICS.

SUMMARY OF THE INVENTION

It is therefore an object of the present disclosure to provide a method and apparatus for reducing the effects of interference between collocated transceivers.

It is an object of the present disclosure to provide a method and apparatus in which proximately located transceivers can simultaneously transmit and receive independent signals without substantially affecting the quality of a desired signal reception.

It is another object of the present disclosure to eliminate the effects of interference between collocated transceivers utilizing interference cancellation.

It is a more particular object of the present disclosure to provide a method and apparatus for automatically tuning a lobed filter such that the signal tracked is near the peak of a lobe for quiescent flat slope in the region of a tracked signal spectrum.

It is yet another object of the present disclosure to provide a method and apparatus for tuning over as large of a band as possible without external interface or control.

It is a more particular object of the present disclosure to provide a method and apparatus for automatically tuning a lobed filter using an off-line process such that inline signal perturbations are minimized.

The present disclosure provides a tuning control system as an element of an interference cancellation system and associated method for continuously and automatically tuning a lobed amplitude slope matching filter (ASMF) to a band center of an inserted coupled transmitted signal for improved interference cancellation system performance and adjusting to match propagation path distortion. More particularly, the tuning control system provides improved rejection of an interfering signal coupled from a transmission antenna into a local receive antenna in the presence of local multipath.

The tuning control system and associated method of the present disclosure provide improved signal rejection over other possible tuning approaches by improving the stability of inline signals while continuously tuning (adjusting) a lobed filter of the tuning control system so that the ASMF filter has a quiescent flat slope in the region of the tracked signal spectrum.

In accordance with one embodiment of the present disclosure a tuning control system is provided for reducing interference in signals coupled from a transmission antenna into a local receive antenna in the presence of a local multi-path. The tuning control system interfaces with a time-delay based lobed filter architecture including a first delay means for forming synchronously locked lobed filters for both a tuning filter for tracking to a predominant interfering signal inserted at an input port and an amplitude matching lobed filter to effect the amplitude slope desired for distortion matching. The tuning control system includes a time-delay based lobed filter architecture including a second delay means for forming a pair of broadband RF lobed filters synchronously locked but offset to effect simultaneity of measurement. The system further includes control means, associated with the first delay means, for tuning the lobed filter structure to track the inserted signal and center it at the peak of the filter, based upon simultaneous measurements of outputs generated by the second delay means, thereby both speeding the tuning process and eliminating the need to perturb the inline signal and thus limit the interference cancellation achievable by the ICS, as is required in the prior art.

In accordance with one embodiment of the present disclosure, a method is provided for continuously and automatically tuning a lobed amplitude slope matching filter (ASMF) to a band center for improved interference cancellation system performance, the method comprising: forming a first broadband RF lobed filter having a quiescent null proximate to and offset above a center frequency of an imaginary broadband RF lobed tuning filter; forming a second broadband RF lobed filter having a quiescent null, proximate to and offset below the center frequency of the imaginary broadband RF lobed tuning filter; detecting a level of RF energy output from the first broadband RF lobed filter as a first broadband RF lobed filter output; detecting a level of RF energy output from the second broadband RF lobed filter as a second broadband RF lobed filter output; calculating an error signal by subtracting the first broadband RF lobed filter output value from the second broadband RF lobed filter output value; integrating the error signal to generate a control voltage; dynamically adjusting the delay time T, via the generated control voltage, to control a lobe bandwidth of the first and second broadband RF lobed filters, an imaginary nulling RF lobed filter and the imaginary broadband RF lobed tuning filter; forming a more narrowband RF lobed filter orthogonal to the imaginary broadband RF lobed nulling filter in its quiescent state, skewing the narrowband RF filter lobe to implement a corrective amplitude slope of the inserted signal, thereby improving the performance in the improved interference cancellation system; and repeating these steps continually.

According to one aspect of the method described above, dynamic adjustment of the time-delay element considers both direction and degree in dependence upon the most recent nulling filter output comparison result.

In different embodiments, the system may be implemented in discreet components or alternatively as a MMIC. Time delays can be implemented as either a switched delay or a continuously variable delay through an analog control voltage.

BRIEF DESCRIPTION OF THE DRAWINGS

These and other objects, features and advantages of the invention will be apparent from a consideration of the following Detailed Description Of The Invention considered in conjunction with the drawing Figures, in which:

FIG. 3a&b are exemplary output waveforms of a lobed filter for illustrating that subtraction, rather than summation, of the output of two signal paths of a lobed filter forms an orthogonal filter of the same repetitive bandwidth as the output of the lobed filter from a basic delay (T).

DETAILED DESCRIPTION OF THE INVENTION

Figure 1B:
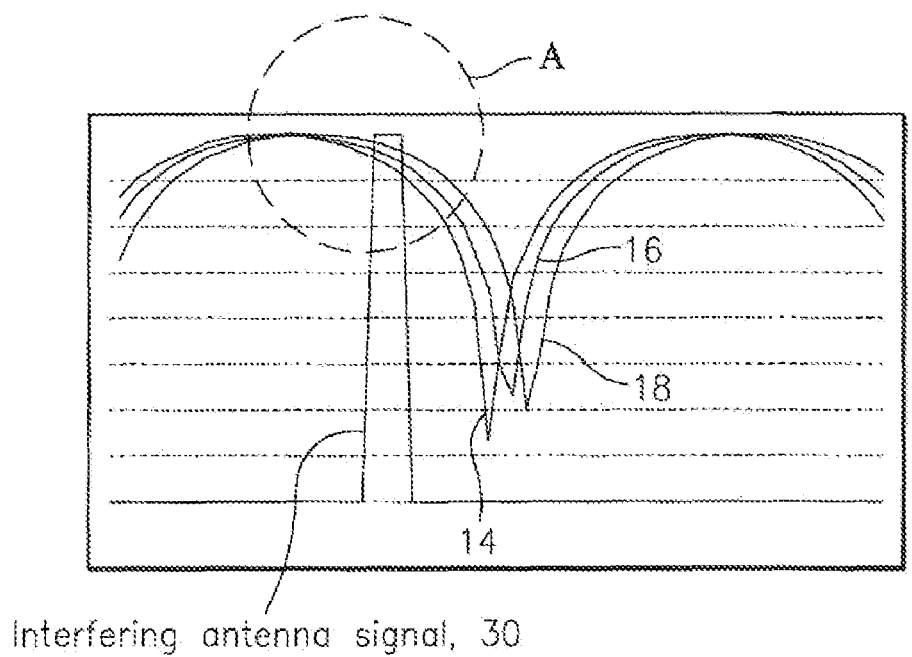
FIGS. 1b&e illustrate, by way of example, signal shaping in an amplitude slope matched filter application with three different filter skews, showing how the amplitude slope is changed by the skew in frequency.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Overview

The present disclosure is directed to a tuning control system and associated method for continuously and automatically tuning a lobed amplitude slope matching filter (ASMF) to a band center of a reference input signal for improved interference cancellation system performance in a cosite interference cancellation system. In some embodiments, the tuning process may be performed off-line to preclude the interruption of processing, during an operation stage, with intermediate or final control signals being transferred to an inline structure to implement the same control.

The present disclosure provides an automated system and method that performs dynamic adjustment of the delay time, tuning an amplitude slope matching filter (ASMF) that centers the ASMF filter on the frequency of its reference input signal 203 as a pre-requisite to offsetting the ASMF filter for slope control (i.e., slope matching).

Referring now to the drawings, FIG. 1 is a circuit diagram for illustrating an improved cosite cancellation circuit 20 for eliminating interfering signals between radio transmitter 21, as an element of transceiver 1, and receiver 25, as an element of transceiver 5, where system dynamics cause changes in the coupling between transmit antenna 2 and receive antenna 4, co-located on a platform, according to one embodiment.

It should be understood that each of the transceivers 1, 5 function independent of the other such that they alternate in being viewed as either the interfering transmitter or protected receiver depending upon the specific needs of the user. However, the system description will only address a single functional aspect for ease of explanation. The transceivers 1, 5 can operate at any RF frequency including, for example, in the high frequency (HF), very high frequency (VHF) and ultrahigh frequency (UHF) spectrums.

The improved cosite cancellation circuit 20 for the elimination of interfering signals between radio transceivers 1, 5, is adapted to be coupled to transceiver 5, in the illustrative embodiment, or other type of device, known or envisioned, capable of receiving electronic signals. The transceiver 1 operating in the transmission mode produces electronic signals for transmission via antenna 2 of transceiver 1. Substantially contemporaneously to this signal transmission, other electronic signals are received by antenna 4 and provided to at least transceiver 5 operating in the receiving mode. As is known to happen, in addition to the signals intended to be received by antenna 4, the co-located transmitter 21 also generates noise and distortion signals which interfere with the electronic signals received by the antenna 4 that are to be provided to a receiver 5.

In order to substantially eliminate the effect of the interfering signals generated from transceiver 1, the novel cancellation circuit 20 is electrically coupled to transmission signal 40. In a preferred form of the present invention, a directional coupler 7 is operatively coupled to the output port of transmitter 21. The cancellation circuit 20 receives a sample of the filtered transmission signal corresponding to the transmitter 1 to which it is coupled.

Operation

In operation, transmitter 21 transmits RF transmission signal 40 through antenna 2 which couples spatially 3 either directly or through a multipath environment into a second antenna 4 connected to a receiver 25 on the same platform as interfering transmitter 21. This coupled energy interferes with the reception in the receiver 25 of its desired reception of a distant transmission. The interfering transmitter 21 thus becomes a collocated source of interference. It is desired to protect the receiver 25 from the interfering transmitter 21. The addition of a simple Interference Cancellation System (ICS) 6 consisting of only a coupled adaptive control loop (ACL) 6 can reduce this interference to a limited extent by sampling the transmission signal 7 and feeding it into the auxiliary port 8 of the ACL 6 while interfering antenna signal 30 is fed into the reference port 9 of the ACL 6.

In an environment clear of reflective obstacles (e.g., no multi-path sources present), the spatially coupled signal 3 from antenna 2 to antenna 4 would be received unchanged except for the propagation delay and the variable lobed filter structure (VLFS) 201 would not be required. However, in a typical multi-path laden environment, the spatially coupled signal 3 is distorted across the band in a number of ways, one of them being an undesirable amplitude slope across the band of interest which is constant in a stable environment but varies with a changing multipath environment of a platform in motion.

Static v. Dynamic Environments

In a static environment, the cable delay, $T_D$277, between sample point 7 and point 8, the input to ACL 6, is ideally adjusted to be the typical coupling delay through space from source antenna 2 to receive antenna 4. This delay, $T_D$277, is implemented to include the delay of VLFS 201. In a dynamic environment, as environmental conditions change with time in an unpredictable manner, a variable amplitude slope can be affected upon the propagated signal resulting in an undesirable mismatch between the coupled transmission (i.e., the signal coupled via path 7 to 8) and the propagated transmission (i.e., the signal coupled via path 2-9) limiting the effectiveness of the applied cancellation. To correct a dynamically changing slope mismatch between the afore-mentioned signals, the present disclosure provides, in one aspect, a variable lobed filter structure (VLFS) 201, as shown in FIG. 1a, and as illustrated in more detail in FIG. 2. The VLFS 201 implements a dynamic correction to the amplitude slope mismatch between the delayed coupled signal 57 and interfering antenna signal 30. It should be appreciated that prior art implementations of the lobed filter structure 201 require both a control signal from the transmitter for tuning and a switch control to select the output lobe. The control signal and switch control are undesirable limitations to a cancellation system's capacity and flexibility. These and other limitations are overcome by the present disclosure.

The present disclosure overcomes these and other limitations of the prior art by providing a novel variable lobed filter structure 201 to implement dynamic, real-time correction to the slope mismatch and an adaptive time delay tuning control 202, coupled to the variable lobed filter structure 201 to provide frequency tuning to the variable lobed filter structure 201 without the need for a tuning control signal or a switch control to be supplied from the transmitter for selecting the correct output lobe of the two formed in the previous architecture. It should be understood, however, that adaptive slope control, is required, in as a further step beyond implementing dynamic, real-time correction to the slope mismatch, to adjust the amplitude slope matched filter to the proper skew to match the amplitude slope of the sampled transmission signal to that of the propagation path.

Figure 1C:
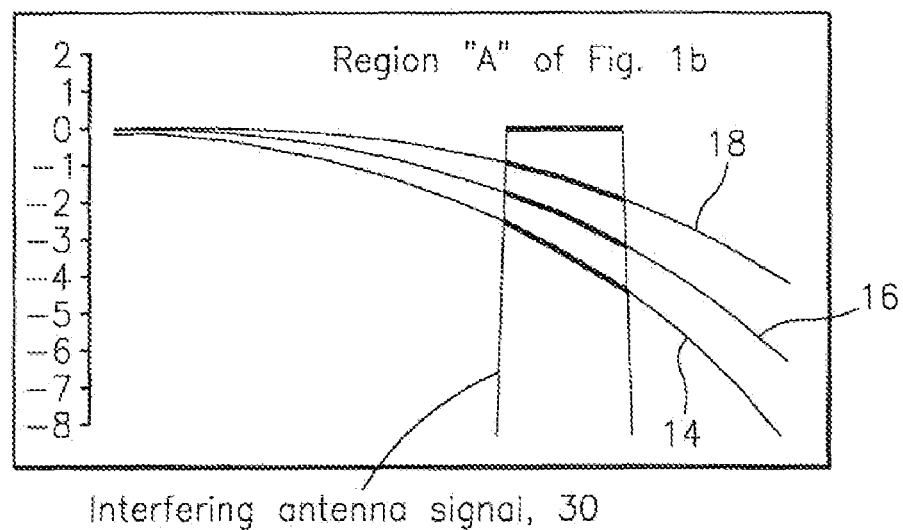
FIG. 1a illustrates the general block diagram of an improved cosite interference cancellation system, according to one embodiment.

FIG. 1b, is a plot of an exemplary interfering antenna signal 30, a portion of which is shown in expanded form in FIG. 1c. The interfering antenna signal 30 is assumed to have been transmitted through propagation path 3, as shown in FIG. 1a, to be received by a receiver 25 co-located on a platform including an interfering radio transmitter 21 and protected receiver 25 where system dynamics cause changes in the coupling between a transmit antenna 2 and a receive antenna 4 co-located on the platform. The coupled transmission signal 40 is desirably shaped by a cosite cancellation circuit 20 of the protected receiver 25 for the purpose of matching the distortion introduced in the propagated interfering antenna signal 30 for improved interference cancellation.

To successfully track and match the distortion introduced by the dispersive propagated interfering antenna signal 30 in a dynamic environment, improved cosite cancellation circuit 20 must first continuously and automatically tune the VLFS 201 which functions as the lobed amplitude slope matching filter (ASMF) 201 to the reference input interfering antenna signal 30 band center. This tuning process is continuously and automatically performed by a tuning control system (adaptive time delay tuning control 202), as a quiescent starting point for performing slope control adjustment.

It should be understood that a key feature of the present disclosure is a system and method for tuning the amplitude slope matched filter (ASMF) 201 as a pre-requisite to performing adaptive slope control adjustment 225 (see FIG. 1a). Adaptive slope control adjustment is well known in the art, and is performed after the ASMF filter 201 has been tuned. It is briefly discussed as follows.

Adaptive Slope Control Adjustment

As is well known, adaptive slope control adjustment may be implemented by skewing a tuned lobed ASMF filter. Skewing of a tuned lobed ASMF filter is illustrated by way of example in FIGS. 1b and 1c. Referring to FIG. 1c, there is shown a region "A" of FIG. 1b three exemplary shifts (i.e., skews) 14, 16, 18 of the lobed ASMF filter 201, each in sequence and having increasing skews, thereby providing increased amplitude slope, adjusted to better match the dispersive path of an interfering signal 30 for improved interference cancellation system performance. Adaptive slope control 225 implements this skewing process by monitoring the protected output 58 of ICS 20 (See FIG. 1a) while dithering control lines (not shown) that adjust the frequency skew of the variable lobe filter structure 201 under a sequence determined by an algorithm and loop feedback of the Adaptive slope control 225.

Figure 2A:
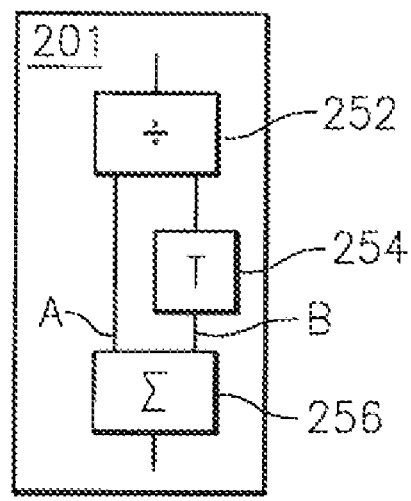
FIG. 2a is a circuit diagram of the general structure of a lobed filter for use in an improved cosite interference cancellation system, according to one embodiment.

Referring now to FIG. 2a, a circuit structure is shown for forming a tunable variable lobed filter 250, according to one embodiment. In this embodiment, the tunable variable lobed filter 250 is implemented using a power divider 252, a variable delay 254 and a summing junction 256. The tunable variable lobed filter 250 is tunable by changing the variable delay value [T] 254. Tuning the variable delay value [T] 254 causes expansion and contraction of each lobe from zero and thus a shift of every lobe, beyond the first, up or down in frequency.

Figure 2B:
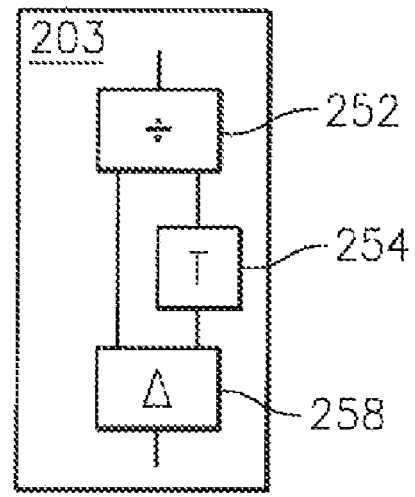
FIG. 2b illustrates the general structure of the lobed filter, for use in an improved cosite interference cancellation system, according to one embodiment.

FIG. 2b is an alternative circuit structure 260 of the tunable variable lobed filter 250 implemented with a difference hybrid 258 as a substitute for the summing junction 256. This creates a functionally similar tunable variable lobed filter 250 as described above but has orthogonal lobes to the structure of FIG. 2a, providing an important mathematical relationship to be used in control of the tuning process, as discussed immediately below and also further below with reference to FIG. 3.

The inventor has recognized two important mathematical relationships that together allow tuning over a large bandwidth and control of a more narrowband filter to provide the desired amplitude shaping effect. The first important mathematical relationship relates to the orthogonal nature of the sine and cosine function of two RF filters simultaneously formed from the same power divider 252 and time delay structure when combined in either a sum or difference port of the tunable variable lobed filter 250, as briefly discussed above. The first recognized mathematical relationship allows the use of a null at one frequency in a sine filter to align with the lobe of the cosine filter, or vice versa, and can be used as a sensitive tuning control, as illustrated in FIG. 3, and described below.

The second important mathematical relationship is the recognition that two RF filters, one tuned with time delay T and the other tuned with a time delay (2n+1)T, where n is an integer, will always have lobes co-aligned at the center of the wider band lobe. It is noted that the relationship is one of the further time delay being an odd multiple of a basic delay T. The implications of such a relationship are described in more detail further below with respect to FIG. 4.

Referring now to FIGS. 3a-3b, there is shown an output of a lobed filter, such as, for example, the tunable variable lobed filter 250 of FIGS. 2a and 2b. The output is represented as curve 390 in FIG. 3a (and further illustrated in expanded form in FIG. 3b).

Referring to FIG. 3a, the output 390 of tunable variable lobed filter 250 is shown as a magnitude (cosine) function of the delay difference in the two paths, i.e., path A and path B, shown in FIG. 2a. The lobed filter amplitude of output curve 390 of FIG. 3a repeats at a regular spacing of $BW_n$ equal to $(2T)^{-1}$. As stated above, in an alternate embodiment, a difference hybrid 258 (See FIG. 2b) can be substituted for the summing junction 256 (See FIG. 2a) of the tunable variable lobed filter 250 FIG. 2a. In such an embodiment, the output 390 of the tunable variable lobed filter 250 follows a magnitude (sine) function, represented as curve 391 in FIG. 3a. Thus, a time delay can be selected to have the tunable variable lobed filter 250, 260 extend beyond a band of interest and a corresponding orthogonal filter will have a null within the tuning bandwidth. For example, by extending tunable variable lobed filter 250 of FIG. 2a beyond a band of interest it will have a null 390 within the tuning band of interest. As a further example, by extending tunable variable lobed filter 260 of FIG. 2b beyond a band of interest, it will have a null 391 within the tuning band of interest.

Figure 4:
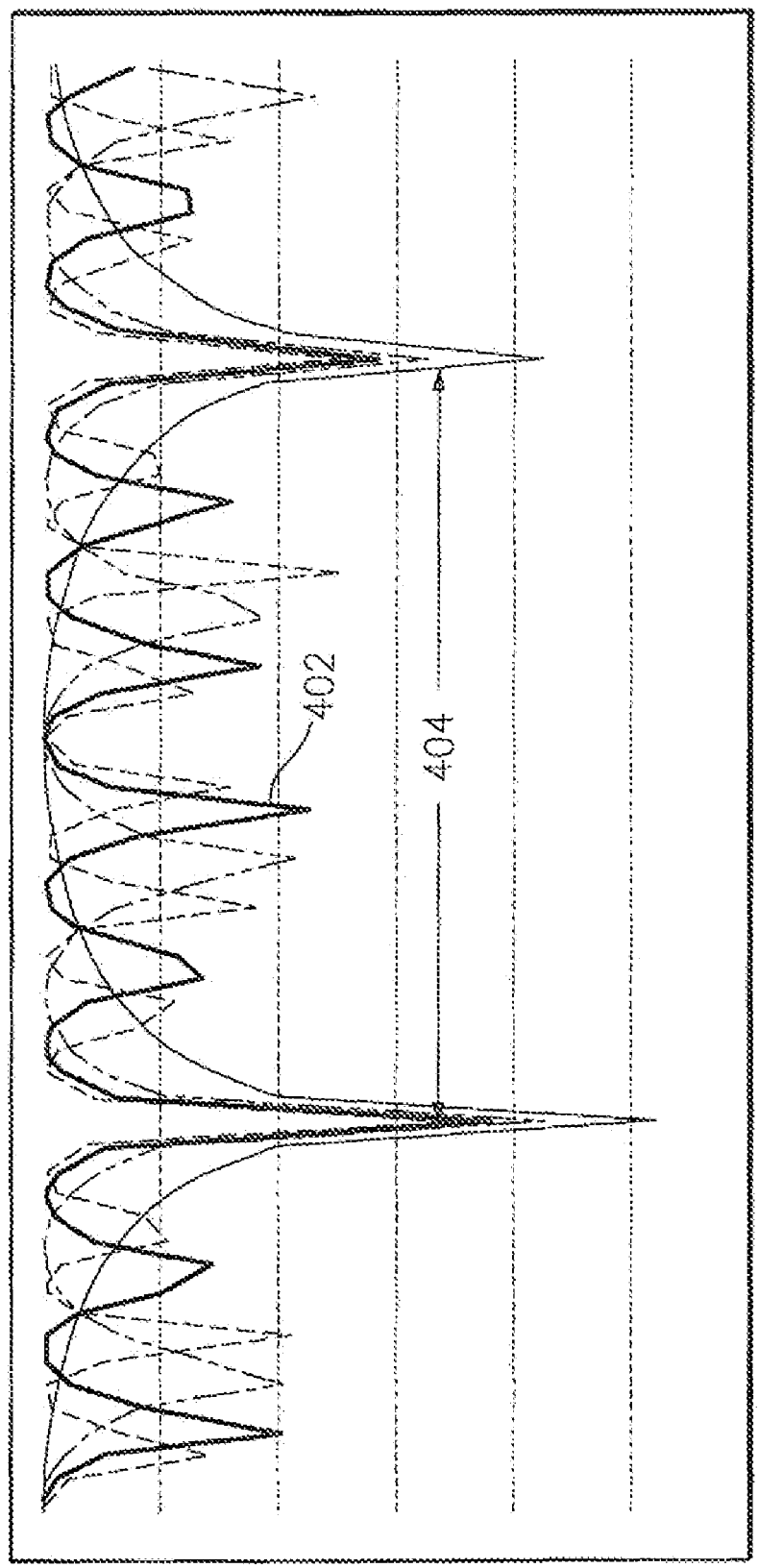
FIG. 4 illustrates a waveform of a narrowband RF filter formed by the summation of two separate signal delay paths of an inserted signal, the narrowband RF filter having an odd number of lobes with one lobe being centered with the tuning lobe of a wideband RF lobed filter formed from a basic delay.

It should be appreciated that the null to null bandwidth, $BW_n$ of the lobed tunable variable lobed filter 250 is inversely proportional to the time delay, T 254, as shown in FIGS. 2a and 2b. Therefore, an increase in the time delay T 254 reduces the bandwidth $BW_n$ of the tunable variable lobed filter 250. Further, by changing the time delay to be an odd multiple of a basic delay T, for example, by (2n+1)T, where n an integer, the original tunable variable lobed filter 250 is effectively split into (2n+1) lobes. As this always results in an odd number of lobes, one lobe 402, necessarily is always centered with the tuning lobe 404 of a broadband tuning filter, as shown in FIG. 4. This centered lobe 402 is the Amplitude Slope Matched Filter (ASMF) to be skewed by the adaptive slope control 225 controller to shape the coupled signal to match the propagated interfering antenna signal 30 in an interference cancellation operation, such as described above. The value of n (i.e., 2n+1 lobes) can be adjusted to achieve the desired flatness at quiescent but provide the required slope without having inserted excessive loss in the path as the filter is skewed. It is realized that the value of n may be made into a variable and controlled in future implementations.

Figure 5A:
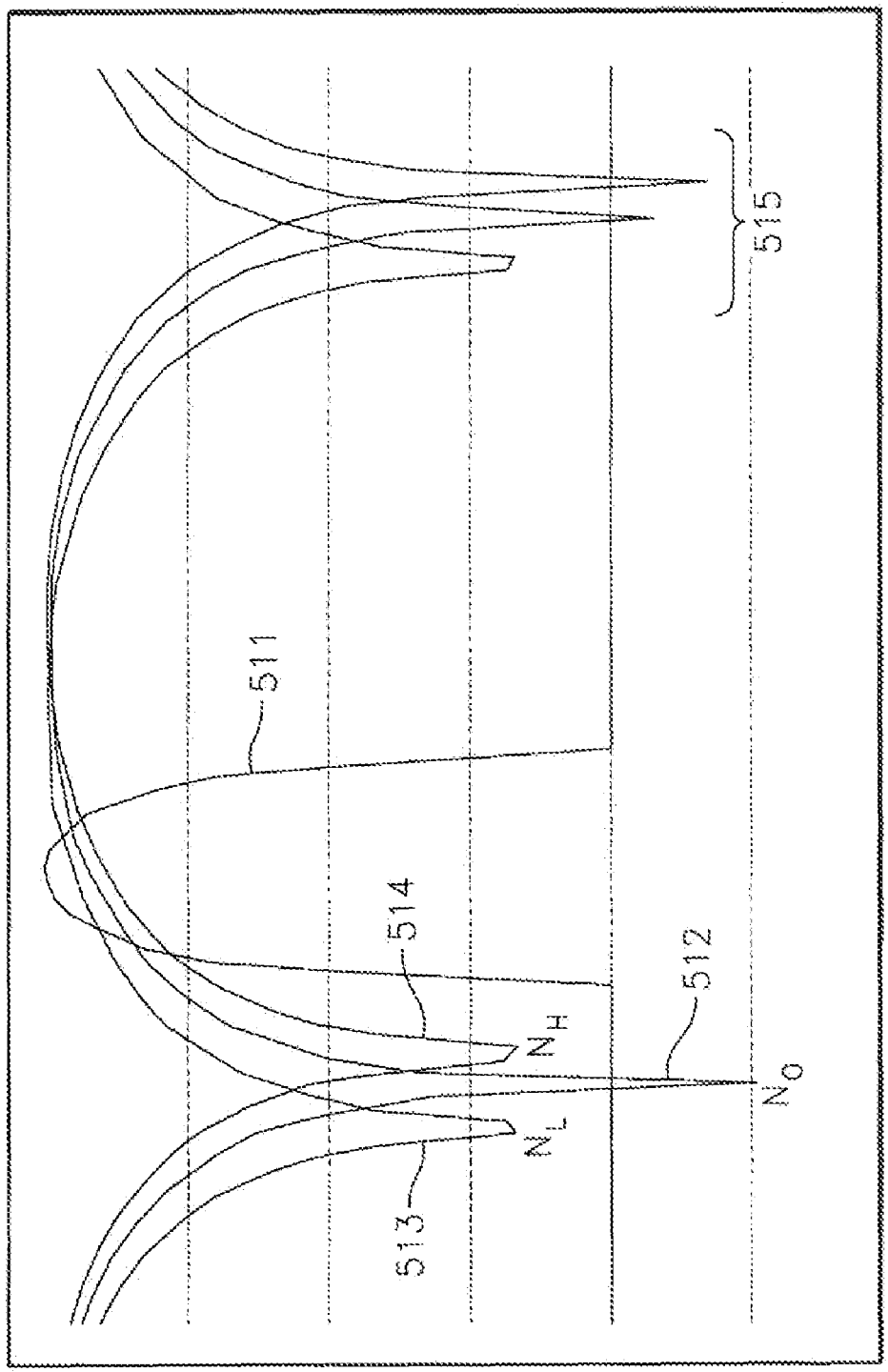
FIG. 5a-c illustrate three different exemplary tuning scenarios of a generated wideband RF lobed filter that is orthogonal to the lobe of an imaginary (unformed) wideband RF tuning filter.
Figure 5B:
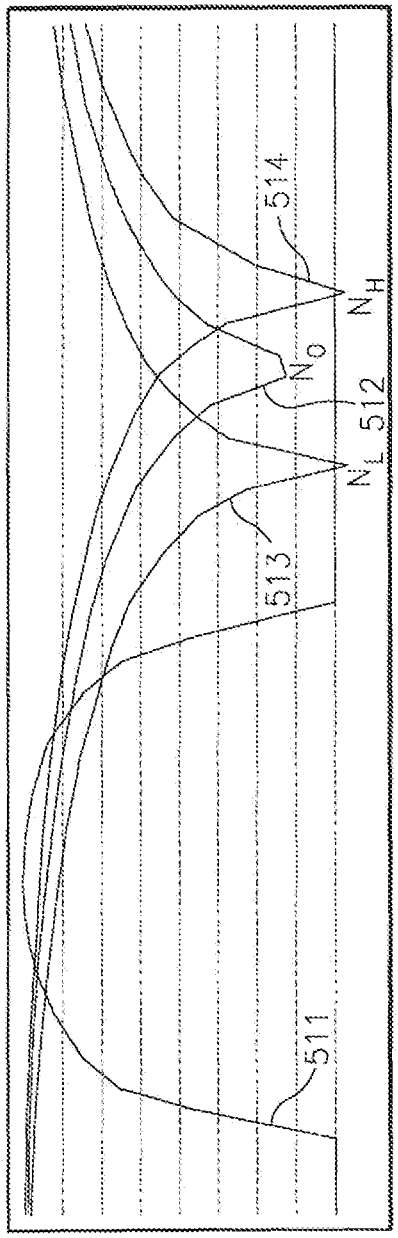
Figure 5C:
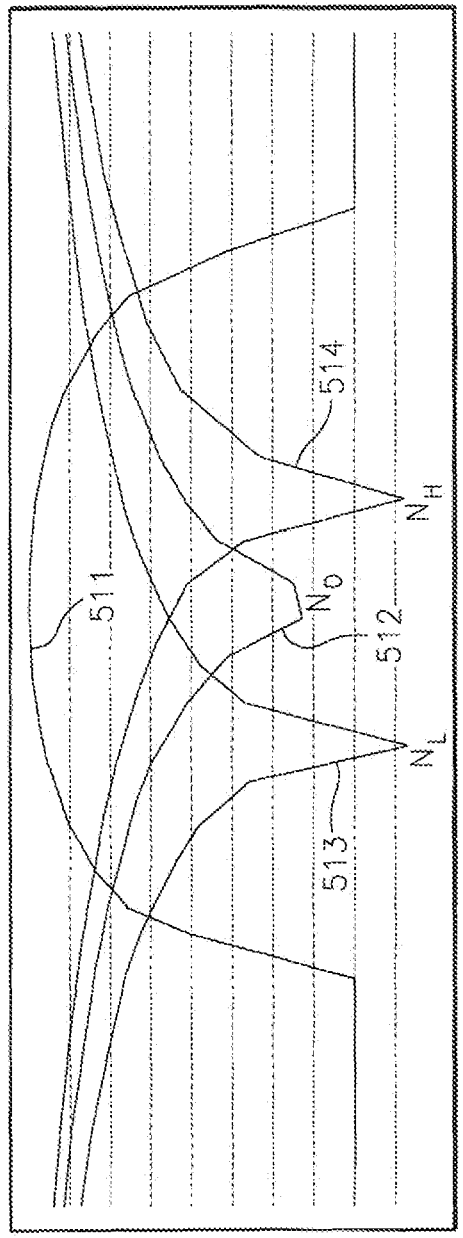
Figure 6:
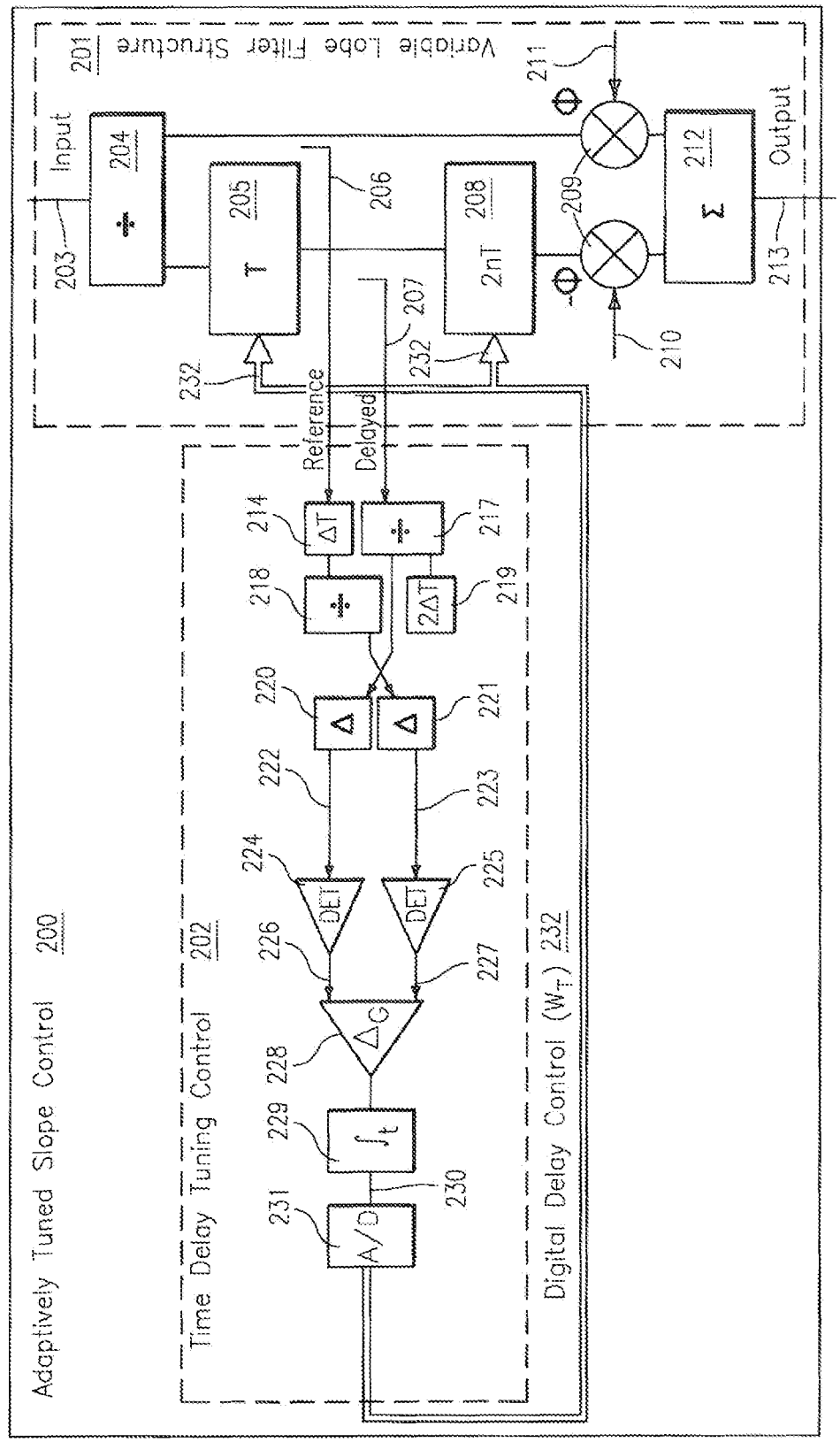
FIG. 6 is an adaptively tuned slope control filter structure with minimum throughput delay and changing delay over time, according to one embodiment.
Figure 7:
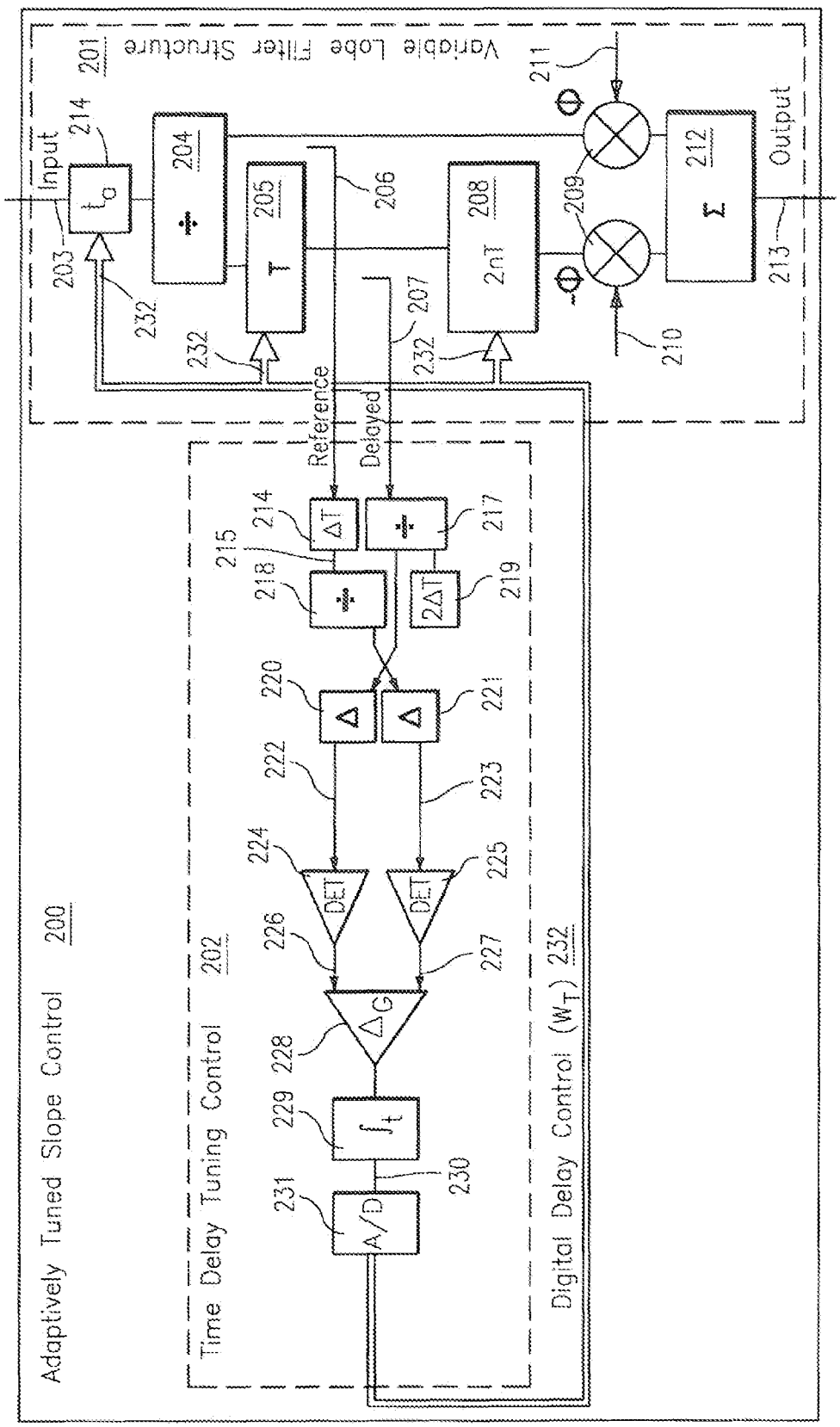
FIG. 7 is an alternate implementation of the adaptively tuned slope control filter structure of FIG. 6, this implementation being capable of constant throughput delay.
Figure 8:
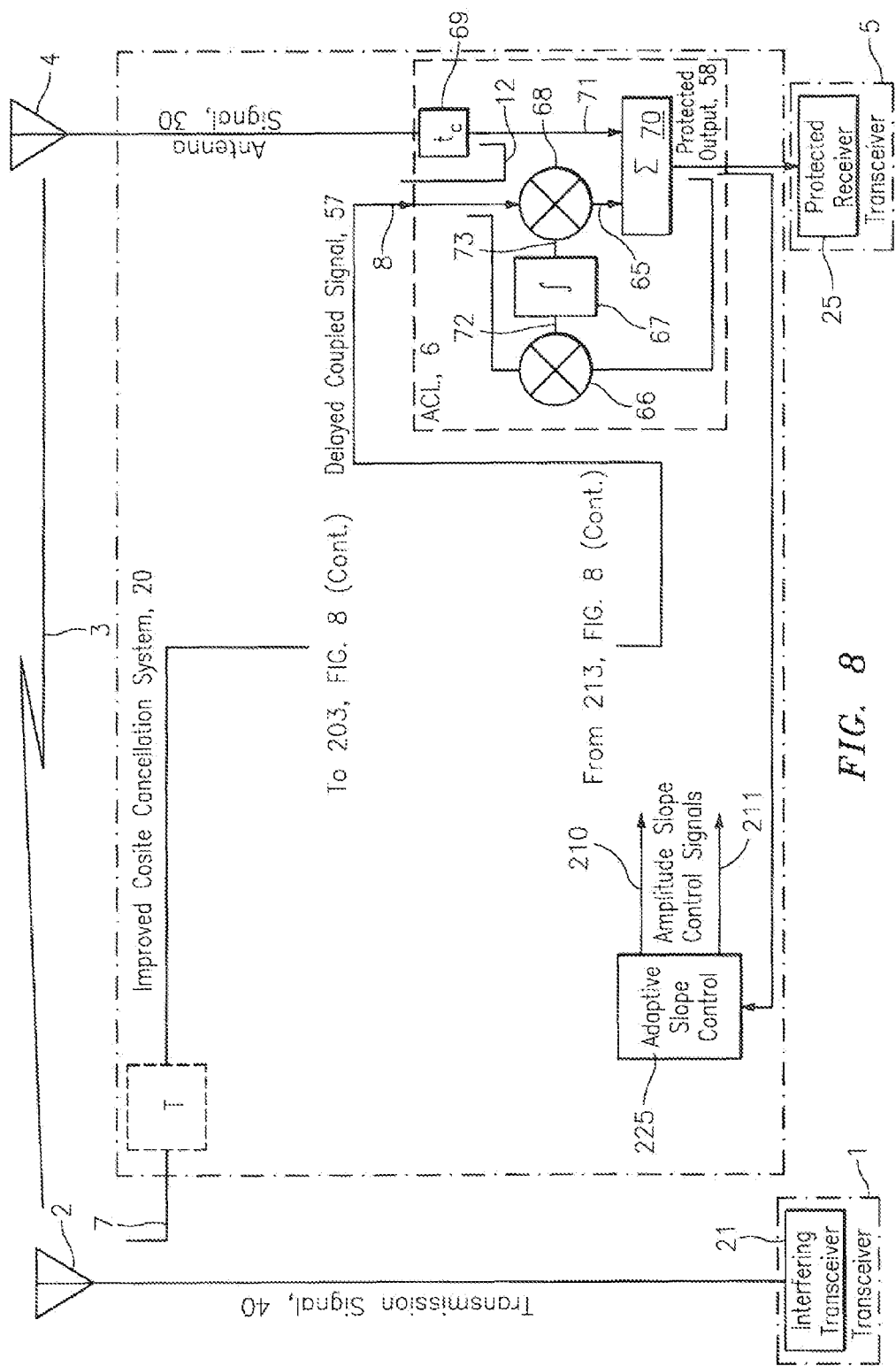
FIG. 8 is a more detailed illustration of the interference cancellation system of FIG. 1 further including an Adaptively Tuned Slope Control (ATSC) module for improved cancellation of a local transmitter signal that is received in the receive antenna with a time varying modulation due to changes in local multipath.
Figure 8:
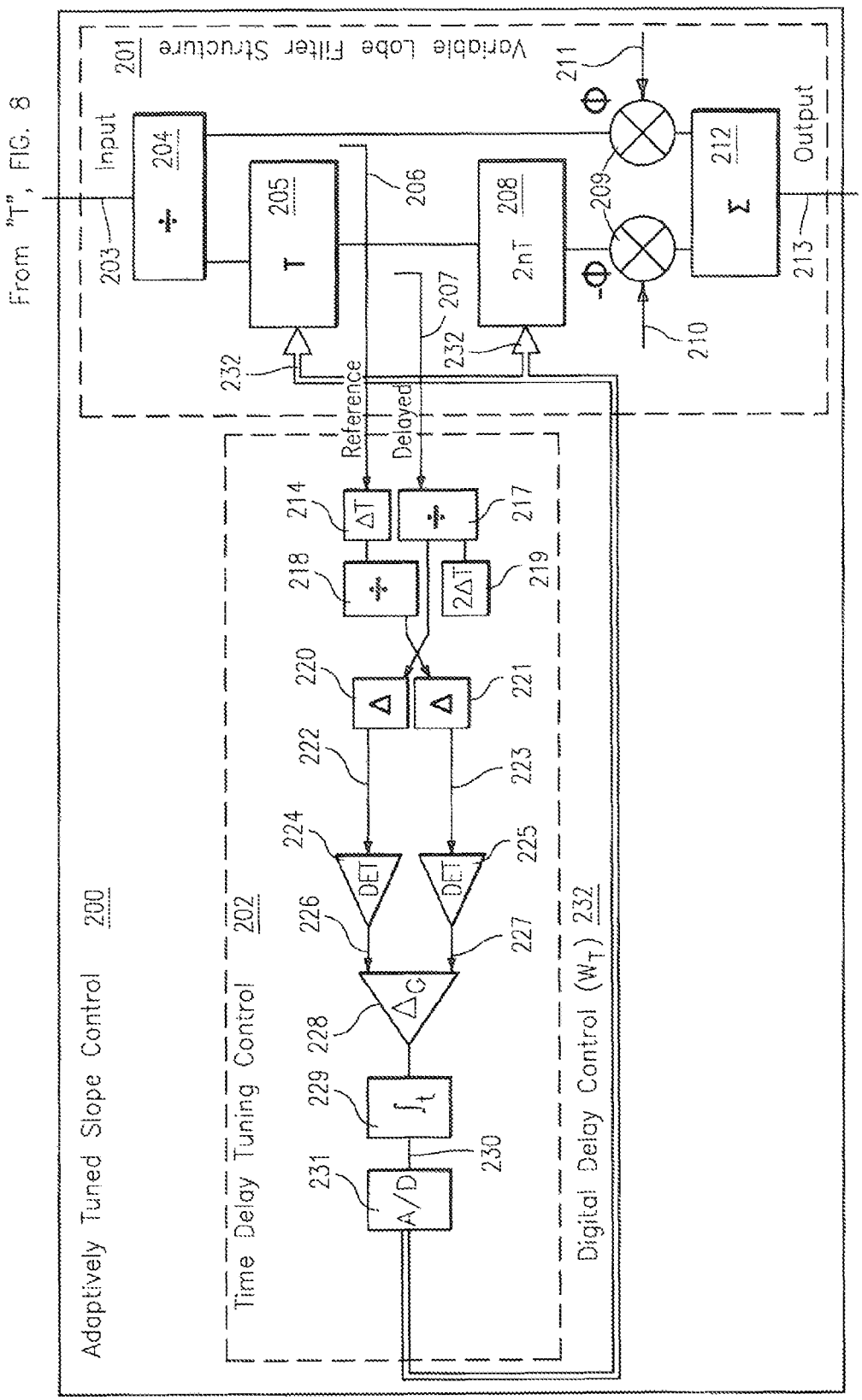

FIGS. 5a-5c illustrate, by way of example, plots of different tuning scenarios to further describe the concept of generating an imaginary lobed filter orthogonal to the lobe of a broadband tuning filter (not shown in FIG. 5). It should be understood that, in accordance with invention principles, a tuning filter lobe of the broadband tuning filter is not necessary for actual operation, and will not be formed in actual operation. It will therefore be referred to hereafter as a so-called imaginary tuning filter lobe. It should be understood, however that the ASMF will track the center of the imaginary tuning filter lobe by use of two RF broadband lobed filters formed off-line in the timing delay tuning control (TDTC) 202, as shown in FIGS. 6-8. These two RF broadband lobed filters, $N_L$ 513 and $N_H$ 514 are formed such that their nulls bracket the null of the imaginary RF broadband lobed nulling filter orthogonal null $N_O$ 512.

Figure 9:
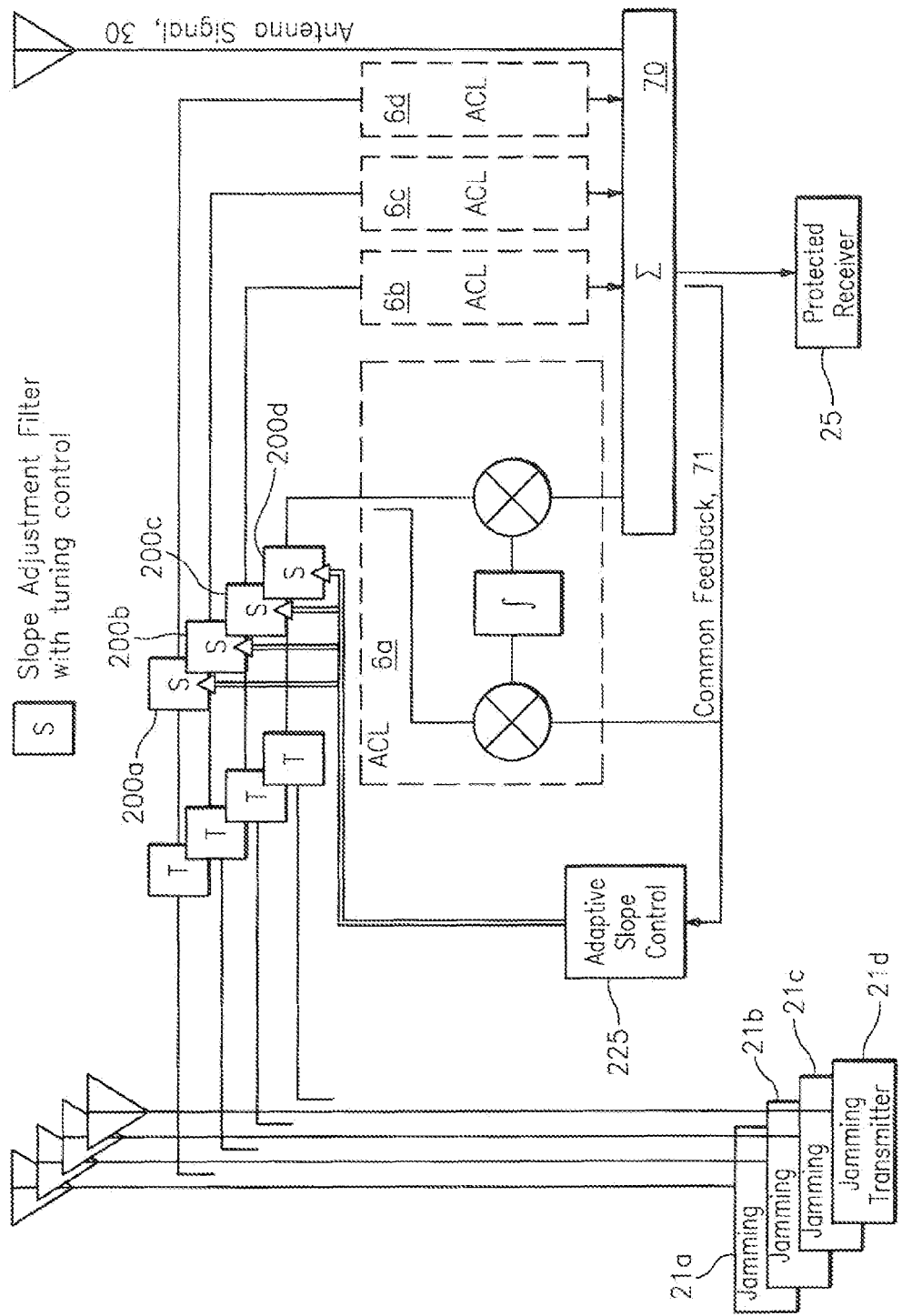
FIG. 9 illustrates one embodiment of an improved cosite interference cancellation system 20 for elimination of interfering signals between three or more co-located transceivers
Figure 10:
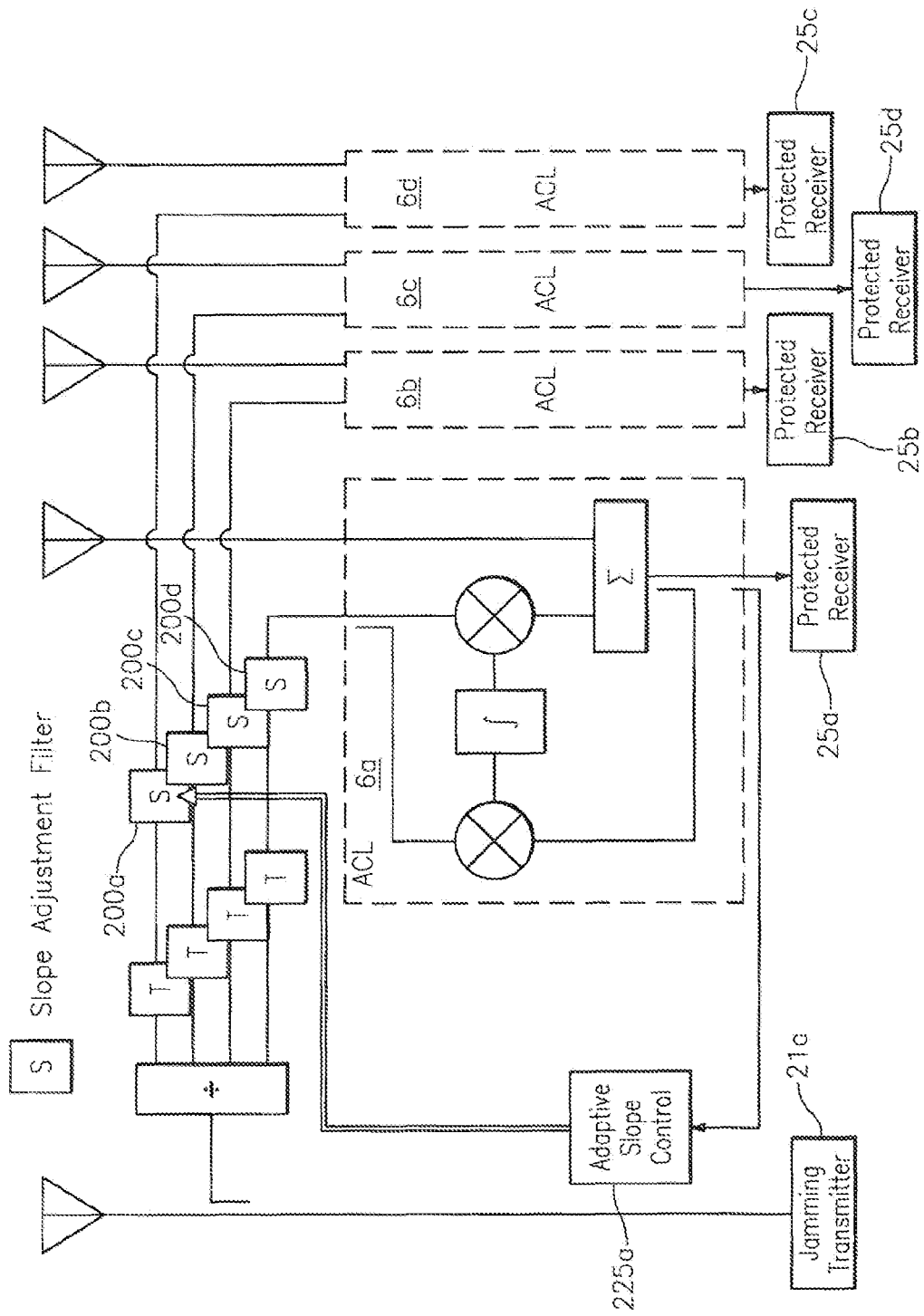
FIG. 10 illustrates an improved cosite interference cancellation system for elimination of interfering signals between a single co-located transceiver and a plurality of receivers to be protected.

FIGS. 5a-5c illustrate, by way of example, plots of different exemplary tuning scenarios to further illustrate the concept of generating a lobed filter orthogonal to the lobe of a broadband tuning filter. It should be understood that, in accordance with invention principles, a tuning filter lobe of the broadband tuning filter is not necessary for actual operation, and is not necessarily formed in actual operation. It will therefore be referred to hereafter as a so-called imaginary tuning filter lobe. It should be understood, however that the ASMF will track the center of the so-called imaginary tuning filter lobe by use of the orthogonal null formed off-line in the timing delay tuning control (TDTC) 202, as shown in FIGS. 1, 9 and 10. Herein, inline refers to an action or process that generates an immediate change, upon signals passing through, at the output of the circuit where offline refers to action or processes that may use samples of signals passing through but do not impact the signals passing through until a result is reached and a change is made to the inline processes.

Each of the plots of FIGS. 5a-5c illustrate a common insertion signal 511 to be tracked. The insertion signal represents the sample of transmitted signal 40 to be matched to an undesirable multipath signal received in antenna signal 30 to be cancelled by the improved cosite cancellation circuit 20 of FIG. 1.

Referring first to FIG. 5a, four output filter curves are shown 511, 512 $N_O$, 513 $N_L$, 514 $N_H$. Output filter curves 512 $N_O$, 513 $N_L$ and 514 $N_H$ represent three different filters tuned with a so-called imaginary tuning filter lobe but orthogonal to the imaginary tuning filter lobe such that nulls of the orthogonal filter are aligned with the peak of a lobe of the original filter formed by the same delay, T. A first filter output curve 512 $N_O$ represents the null portion of a lobed filter, $N_O$, formed by current value of delay T, orthogonal to the tuning filter tuned on frequency with the imaginary tuning filter by using the same delay T used to form the tuning filter. Using the same delay used to form both the first filter output curve 512 $N_O$ and the imaginary tuning filter, results in a null of the first filter output curve 512 $N_O$ aligned with the imaginary tuning lobe of the tuning filter, as shown in FIG. 3.

A second filter output curve 513 $N_L$ represents the null portion of a lobed filter, $N_L$, formed by delay T+ΔT, an incremental step of delay time T 254 of the circuit of FIG. 2. tuned low in frequency with a path delay difference of T+ΔT and results in a null below, or lower than the current center frequency of the imaginary tuning lobe of the broadband lobed filter.

A third filter output curve 514 $N_H$ represents the null of the lobed filter, $N_H$, is tuned high in frequency with a path delay difference of T−ΔT and results in a null above, or higher than, the current center frequency of the imaginary tuning lobe of the broadband lobed filter.

With continued reference to FIG. 5a, there is shown the condition in which the filter, $N_O$, is centered at a frequency that is below the frequency of the insertion signal 511. In this case, the filter $N_H$ allows more of the inserted signal energy of the inserted signal 511 through, than the filter $N_L$ thus providing feedback to the interference cancellation system to move the tuning filter higher in frequency by decreasing the delay, T.

FIG. 5b illustrates the case in which the filter, $N_O$, is centered at a frequency that is above the frequency of the insertion signal 511. In this case, the filter $N_L$ allows more of the inserted signal energy of the inserted signal 511 through, than the filter $N_H$ thus providing feedback to the interference cancellation system to move the tuning filter lower in frequency by increasing the delay, T.

FIG. 5c illustrates the case where conditions when the filter, $N_O$, is centered on the inserted signal. In this case, the low and high filters, $N_H$ and $N_L$, will pass equal amounts of the inserted signal energy, thus providing no feedback to change frequency by changing the delay, T. This state represents a point of stability in tuning such that, as the null of the orthogonal filter is aligned with the inserted signal and thus aligned with the peak of the center of the lobe of the imaginary tuning filter, the inserted signal is thus aligned with the peak of the ASMF center.

It should be understood that the direction of the null shifts as a function of the time delay introduced by the interference cancellation system is inherent to lobed filters which are comprised of a plurality of nulls originating at zero Hz and repeating at a regular spacing of $(2T)^{-1}$. Thus an increase in delay T reduces the effective $BW_n$, thereby compressing the lobing and shifts the current null to the left, i.e., lower in frequency.

Referring again to FIG. 5a, the center null 512 $N_O$ is representative of a filter output null which is orthogonal to the corresponding filter output formed by the summation of the output of filter signal paths with path delay differences formed by the inline delay T.

The left null 513 $N_L$ represents the null of a filter output having a path delay T+Δt, the output exhibiting a slightly more narrow lobed structure than the output of a filter signal path having a path delay T, and thus the repetitive lobing shifts to the left, lower in frequency, moving the null below the nominal location using delay T.

The right null 514 $N_H$ represents the null of a filter output having a path delay T−Δt, the output exhibiting a slightly wider lobed structure than the output of a filter signal path having a path delay T, and thus the repetitive lobing shifts to the right, higher in frequency, moving the null above the nominal location using delay T.

It should be appreciated that these two filter output curves 513 $N_L$, 514 $N_H$ advantageously allow different amounts of the incident signal energy to pass through them. In this manner, measurement of the energy from the respective filter outputs provides information on a corrective direction in frequency of the tuning lobe orthogonal filter required for proper tuning.

With continued reference to FIG. 5a, this figure further illustrates a set of undesirable image nulls 515. It is appreciated that these undesirable image nulls 515 are a limitation to the tuning bandwidth of the tuning control system. They arise by using too large of a value of delay T, resulting in an excess of narrow lobes for tuning. It therefore follows that it is desirable to have as large a tuning bandwidth as possible to preclude the creation of these image nulls. It is preferred that tuning to the low edge of the frequency tuning band cannot allow image nulls to approach the high band limit for inserted signal, or vice versa, or the system may shift lobes of the tuning filter upon a jump in transmitted signal frequency, and cause significant change in subsequent filter bandwidths and thus shaping amplitude factors. The narrowband filter cannot be used for tuning because of this limitation. This shows the importance of the recognition of the lobe alignment for filters formed by T and (2n+1)T delays so that the tuning filter lobe can be very broad for a broad tuning range but still be used to focus a much more narrow lobe for ASMF function.

As stated above, a primary objective of the tuning control system of the present disclosure is to continuously and automatically tune a ASMF to an interferer band center as a quiescent starting point for performing quadratic amplitude control adjustment. While it is understood that amplitude control adjustment is not central to the teachings of the present disclosure, it is understood that it is implemented by controlling the weights of the tuned ASMF, tuned in accordance with invention principles.

FIG. 6 provides the circuit structure of a tuning control system, according to one embodiment, for continuously and automatically tuning a lobed amplitude slope matching filter (ASMF) 201 to a band center of a reference input signal 203 for improved interference cancellation system performance in a cosite interference cancellation system.

An Adaptively Tuned Slope Control (ATSC) module 200 comprises two main elements; an inline Variable Lobe Filter Structure (VLFS) 201 and an offline Time Delay Tuning Control (TDTC) element 202. Inline and offline are indicative of the path from the signal source to the point of application of the matched signal.

The variable lobe filter structure (VLFS) 201 implements the functionality of a tuned and quiescent amplitude slope matched filters of the prior art but is uniquely constructed in a novel manner as a variation of a conventional in-line Lobe Filter Structure such that the delay line forming the lobed filter is split into two blocks of controlled variable time delay. Specifically, the delay line is split into aA first block, T 205 with delay T and a second block 208 with delay, 2nT 208, yielding a total delay of (2n+1)T. The first block 205 is used for broadband tuning and the second block 208 is, implemented as a multiple of the first block 205, thus making the slope control filter 201 more narrowband. As discussed above, a resulting slope control filter lobe formed by the (2n+1)T relationship is centered in the lobe of an imaginary filter orthogonal to the null of the broadband tuning filter lobe formed by the delay T but is never actually formed. This establishes the tuned lobed filter that is then skewed to adjust amplitude slope, as taught in the prior art and fed into port 8 of the ICS for improved interference cancellation, advantageously requiring no control signals from the transmitter.

The Timing Delay and Tuning Control (TDTC) module 202 uses signal samples output from the variable lobe filter structure (VLFS) 201 to control the first block, T 205 for tuning, which is central to the teachings of the present disclosure, and the second block, 2nT 208, to implement the ASMF used by the interference cancellation system, which is a prerequisite for implementing the amplitude slope adjustment to match the propagated path of the interfering signal.

It should be understood that the tuning filter lobe and the nulling filter null are referred to herein as imaginary in the sense that they are never actually formed or used in actual operation but are instead discussed herein to provide a more complete understanding of the interrelationships of the various control signals and the generation of the ASMF filter.

With continued reference to FIG. 6 reference signal 206 and delayed signal 207 are sampled; reference signal 206 is delayed in delay line 214 to form delayed reference signal 215; delayed reference signal 215 and delayed signal 207 feed into a network of power dividers 217, 218, delay line 219 and differencing hybrids 220, 221 to form two broadband RF filters, a first broadband RF filter having a filter response 222 with a relative high frequency null as a function of $T-\Delta T$ and a second broadband RF filter having a filter response 223 with a relative low frequency null as a function of $T+\Delta T$. Thus the offline sine function filters formed using the variable T 205 have nulls in the region of the center of the imaginary tuning filter lobe and bracket the null of the imaginary nulling filter, both based upon this T, which are never formed.

Referring back to FIG. 5, output filter curves 514 $N_H$, 513 $N_L$ and 512 $N_O$ correspond to: the first broadband RF filter response 222, the second broadband RF filter response 223, and the nulling filter orthogonal to the imaginary tuning filter lobe. Thus it is not necessary to modify the value of T to make successive energy output measurements of the nulling filter with tuning delays of $T-\Delta T$ and $T+\Delta T$ to determine direction of change necessary for convergence to steady state solution.

Referring now to the lobed filter structure 201, the outputs of the filter ports 222 and 223 pass through RF detectors 224 & 225 to measure RF energy outputs which are then compared by subtraction in an Operational amplifier 228. The difference signal is then integrated in a low pass filter 229 and converted to a digital control signal and provided as respective inputs to the delay line segments 205, 208. This establishes the narrowband tuned lobed filter for amplitude slope matching that is then skewed to adjust amplitude slope in the manner of prior art and fed into port 8 of the ICS for improved interference cancellation requiring no control signals from the transmitter.

The response time of the TDTC is a function of signal bandwidth, the tuning filter null spacing function of ($\Delta T$), loop gain (G), and integration time constant (t). Standard control loop theory applies to the design of the loop to assure stability while allowing timely convergence. Too fast of a response allows oscillations and noisy wanderings of the control signal and thus the filter lobe center. Too slow of a response will not allow the system to respond to dynamics of the platform environment. The value of $\Delta T$ needs to be selected such that it is small enough so the energy passed by the filters in the region of the desired signal is sufficient to hold the tracking without allowing noise to unduly perturb the control but large enough so that the filter resulting is monotonic in the tuning bandwidth.

FIG. 7 is an alternate implementation of the adaptively tuned slope control filter structure. The delay through the VLFS 201 of FIG. 6 has a time varying delay equal to [½(2n+1)T+offset delay of φ], varying with variable delay setting T. The variable lobe filter structure of this implementation has the potential of constant throughput delay by continuously adjusting input delay $t_a$ 214 such that the total throughput delay stays a constant through the VLFS.

FIG. 8 is a more detailed circuit diagram of FIG. 1a for illustrating an improved interference cancellation circuit 20 for elimination of interfering signals between radio transmitter 21, and receiver 25 where system dynamics cause changes in the coupling between a transmit and receive antenna on a platform, according to one embodiment.

A time delayed, amplitude slope matched sample of transmission signal 40 is output from adaptively tuned slope control 200 as the delayed coupled signal 57 and supplied to auxiliary port 8 of ACL 6. Interfering antenna signal 30 is fed into reference port 9 of ACL 6. A cancellation signal 65 is generated by ACL 6 via the processes of autocorrelation 66, integration 67, and finally by applying a complex weight 68 of phase and amplitude. The cancellation signal 65 is provided to summing junction 70. It is noted that when the cancellation signal 65 is injected into summing junction 70 it has substantially the same amplitude as the transmitted path signal 71, i.e., interfering antenna signal 30, however, the cancellation signal 65 is manipulated so that it is 180° out of phase with the interfering antenna signal transmitted antenna signal 30 propagated and received by antenna 4 and included in antenna signal 30 so as to substantially cancel the interfering signal. Adaptive slope control 225 monitors the protected output 58 of ACL 6 while dithering control lines 210 and 211 under a sequence determined by its algorithm and loop feedback. As a result, the signal remaining on the protected output 58 is substantially the same as the received antenna signal 30 provided by receiver antenna 4 without the undesired contribution from interfering transmitter 1. ACL 6 is configured as a Least Mean Square (LMS) analog control loop but those familiar with the art will realize that many different algorithms, implemented at RF and digital, can serve this function.

The adaptive slope control 225 of prior art is still required to adjust the amplitude slope matched filter to the proper skew to match the amplitude slope of the sampled transmission signal to that of the propagation path. Adaptive slope control 225 implements this process by monitoring ICS protected output 58 while dithering control lines 210 and 211 under a sequence determined by its algorithm and loop feedback.

The use of sum or difference hybrids in the off-line processing and in-line processing may be switched to design the system for a specific tuning band and slope control lobed filter width. This embodiment is just one configuration.

If the tuning information is available from the transmitter, it could be used for a table lookup of the starting point for the value of T. Thus, when the transmitter switched frequency, tuning would start at approximately the correct value. These stored values may be a one-time set value at manufacture or may be updated every time the frequency is visited.

Referring now to FIG. 9 there is shown four co-located interfering transmitters 21a-21d, by way of example and not limitation. Four are shown for ease of explanation. To counteract the multiple interfering transmitters 21a-21d, and thus reduce or minimize cosite interference, the improved cosite interference cancellation system 20 includes a common adaptive slope control 225 of prior art operably coupled to a common summing junction for four Interference Cancellation Systems (ICS) 6a-6d, and four independent Adaptively Tuned Slope Control (ATSC) module 200 comprised of two main elements; an inline Variable Lobe Filter Structure (VLFS) 201a-201d and an offline Time Delay Tuning Control (TDTC) element 202 operably coupled to a common summing junction for four Interference Cancellation Systems (ICS) 6a-6d. Four of which are shown for ease of explanation and not limitation. In this manner, the cosite interference cancellation process described above with reference to FIG. 8 is independently applied to each interfering transmitter 21a-21d to protect the single receiver 25. This figure shows a preferred embodiment with common, shared antenna signal 30, summing junction 70 and feedback signal 71. The function of the Variable Lobe Filter Structure (VLFS) 201a-201d are in-line and must be independent but the function of the Time Delay Tuning Control (TDTC) element 202 and adaptive slope control 225 can be shared through multiplexing techniques implemented in prior art of adaptive arrays where the correlation and integration functions were shared. In other embodiments, the ICS summing junctions are daisy-chained for the use of a standard building block at the cost of additional potential noise insertions and longer convergence times because of signal interaction.

Referring now to FIG. 10 there is shown an improved cosite interference cancellation system 20 for elimination of interfering signals between a single co-located transceiver 21 and a plurality of receivers to be protected. In the presently described embodiment, it is desired to protect a multiplicity of receivers, 25a-25d, four of which are shown by way of example and not limitation. To protect the plurality of receivers 25a-25d, each receiver is coupled to a corresponding Interference Cancellation Systems (ICS) 6a-6d operably coupled with associated independent Adaptively Tuned Slope Control (ATSC) module 200a-200d each comprises three main elements; a Variable Lobe Filter Structure (VLFS) 201, a Time Delay Tuning Control (TDTC) element 202, and a common adaptive slope control 225 of prior art.

The foregoing is to construed as only being an illustrative embodiment of this invention. Persons skilled in the art can easily conceive of alternative arrangements providing a functionality similar to this embodiment without any deviation from the fundamental principles or the scope of the invention.

What is claimed is:

1. An interference cancellation system, comprising:
   (A) an adaptively tuned sloped control (ATSC) module 200 for providing a tuning procedure directed to an ASMF control function to the band of interference and for externally controlling the ASMF control function subsequent to said tuning, said adaptively tuned sloped control (ATSC) module (200) comprising:
   a) an inline variable lobe filter structure (VLFS) 201 for providing controlled variable time delay for generating; (1) a first broadband RF lobed filter formed by a delay T−ΔT, a second broadband RF lobed filter formed by a delay T+ΔT, and (3) a slope control filter lobe formed by a first delay T 205 and a second delay (2nT) (208) yield a total time delay of (2n+1)T centered in the null of the imaginary broadband RF lobed nulling filter and skewed by an external slope control signal;
   b) an offline time delay tuning control (TDTC) element (202) for receiving signal samples output from the inline variable lobe filter structure (VLFS) (201) to control a first variable time delay element (T) (205) of the inline variable lobe filter structure (VLFS) 201 to provide said controlled variable time delay to generate said broadband RF tuning filter and a second variable time delay element (2nT) (208) of the inline variable lobe filter structure (VLFS) 201 to provide said controlled variable time delay to generate said slope control filter lobe;
   (B) an adaptive control loop (ACL) (6) for adjusting a complex weighting of a delayed coupled signal to maximally cancel a propagated received signal (30).

2. The interference cancellation system of claim 1, wherein the inline variable lobe filter structure (VLFS) 201 comprises:
   a) said first variable time delay line (T) 205 for providing broadband tuning of an imaginary tuning filter lobe; and
   b) a second variable time delay line (2nT) 208, added to first variable time delay element (205), for providing more narrowband tuning of the imaginary tuning filter lobe relative to said first delay element;
   wherein said narrowband tuning filter is skewed by an external slope control signal.

3. The interference cancellation system of claim 1, wherein the second variable time delay line (2nT) (208) is an integer multiple of said first time delay line (T) 205.

4. The interference cancellation circuit (6) of claim 1, wherein the adaptive control loop (6) comprises:
   a reference port (9) for receiving the propagated received signal (30);
   an auxiliary port (8) for receiving a delayed and matched coupled signal (57);
   a complex correlator (66) for generating error correlation signal (72)
   an integrator (67) to smooth transients on the error correlation signal (72) to form the adaptive weight control signals(73);
   a complex phase and amplitude weighting device (68) having a first input and a second input, said first input receiving said delayed and matched coupled signal (57), said second input receiving a complex adaptive weight control signal(73)to weight the delayed and matched coupled signal (57) to produce a weighted delayed coupled signal, (65); forming the weighted delayed signal as a mirror image of the transmitted reference signal; and
   a summing junction (70) having a first and second input, said first input for receiving said weighted delayed coupled signal (65) output from said complex phase and amplitude weighting device (68), said second input for receiving the received reference signal (71) to yield a protected output signal (58).

5. The interference cancellation system of claim 1 wherein said propagated received signal (30) comprises at least a transmission signal (40) transmitted from a first antenna (2) and received at a second antenna (4), and wherein said propagated received signal (30) is propagated through an uncontrolled path between said first (2) and second (4) antennas.

6. The interference cancellation system of claim 4, wherein forming the weighted delayed coupled signal (65) as a mirrored image of the transmitted reference signal indicates that it is equal in amplitude and 180° out of phase with the received portion of the transmitted signal 40 in the received reference signal (71).

7. The interference cancellation system of claim 1, wherein said reference signal (30) includes at least one other signal.

8. The interference cancellation system of claim 7, wherein the at least one other signal is a desired signal anticipated by receiver (25).

* * * * *